Patented Mar. 12, 1935

1,994,070

UNITED STATES PATENT OFFICE 1,994,070

PROCESS FOR TREATING RAW PHOSPHATES

Antonius Foss, Oslo, Norway, assignor to Norsk Hydro-Elektrisk Kvaelstofaktieselskab, Oslo, Norway No Drawing. Application July 20, 1932, Serial No. 623,603. In Norway August 29, 1931

4 Claims. (Cl. 71—7)

This invention relates to an improved process for treating raw phosphates for producing valuable products therefrom. It is the object of the invention to provide a method, by which the raw phosphates may be treated in a more suitable manner than before.

When raw phosphates are decomposed according to well known methods with a chemical agent for instance an acid without the phosphates having been subjected to any previous treatment, the following substances may develop, viz. hydrofluoric acid, hydrofluorsilicic acid, hydrochloric acid and even free chlorine. All these substances have a very strong corrosive effect on the apparatus, especially during the concentration of the solution formed.

Experiments show that even high quality acid resisting materials used in a process of this kind are within a short time subjected to serious destruction. This, I have proved, is due to the presence of halogen compounds, made free during the process.

According to this invention I avoid this trouble by exposing the raw materials to a process, whereby the halogen compounds are removed before the decomposition process.

In accordance with the invention the raw phosphates are rendered free from halogens before the decomposition process, and for this purpose the raw phosphate in its natural state is exposed to the action of a phosphoric acid reactive agent, i. e., an acid substance containing phosphoric acid, whereupon the mass is heated so that detrimental halogen compounds are expelled before the decomposition with the acid. The resulting material may then be subjected to an acid treatment, e. g., according to well known methods as referred to above.

I have discovered that the most expedient way of carrying out the invention is to treat the raw phosphate with phosphoric acid and then to heat the mixture, whereby the detrimental substances are expelled.

Instead of pure phosphoric acid, I may employ as the phosphoric acid reactive agent the salt solutions containing phosphoric acid obtained in one or other stage of the process of manufacture, for instance, washing solution, which in any case is going to be evaporated, and by this means the heating of the solution together with the raw phosphate will not render the process more expensive. I may also use reacting phosphoric acid compounds, such as superphosphate or double superphosphate. The gases and vapours developed during the heating can be utilized or neutralized in a known manner,

Example 1

1 part of finely pulverized Florida pebble phosphate containing about 75 percent $Ca_3(PO_4)_2$ and 3.6% fluorine is mixed together with 0.25 parts of $H_3PO_4$ in the form of 60 per cent. phosphoric acid. The phosphoric acid reacts with the tricalciumphosphate with formation of phosphoric acid calcium-compounds as secondary and primary phosphates. The reaction proceeds with evolution of heat so that a semi-solid mass is obtained. After the mass has congealed, it is coarsely pulverized and heated in a rotating furnace to about 1000° C. The calcined product contained 0.3 per cent. of fluorine. This product may be treated in known manner, e. g., with nitric acid, for production of fertilizer, etc.

Example 2

1 part of a finely pulverized mixture consisting of 75 per cent. Florida pebble phosphate of the same composition as given above and 25 per cent. Bamle Apatite containing about 75 per cent. $Ca_3(PO_4)_2$ and 4.75 per cent chlorine is mixed with 0.25 parts of $H_3PO_4$ in the form of 60 per cent. phosphoric acid. The phosphoric acid reacts with the tricalciumphosphate with formation of phosphoric acid calcium compounds as secondary and primary phosphates. The reaction proceeds with evolution of heat so that a semi-solid mass is obtained. After the mass has congealed, it is coarsely pulverized and heated in a rotating furnace to about 1000° C. The calcined product contained 0.4 per cent of clorine and 0.15 per cent. of fluorine.

This product may be subjected to known treatment, e. g., with acid, as suggested for Example 1.

Example 3

A double superphosphate was made by mixing 1 part of finely pulverized pebble phosphate with 1.1 part of $H_3PO_4$ in the form of 83 per cent. phosphoric acid. The phosphoric acid reacts with the tricalciumphosphate with formation of phosphoric acid calcium compounds as secondary and primary phosphates. The reaction proceeds with evolution of heat so that a semi-solid mass is obtained. The congealed product was finely pulverized and was mixed together with further 3.4 parts of pulverized raw phosphate. The mixture was moistened with water in order to avoid any formation of dust, and was thereupon heated in a rotating furnace to about 1000° C. The calcined product contained 0.3 per cent. of fluorine.

This product may be subjected to known treatment, e. g., with acid, as suggested for Example 1.

It will be perceived from the examples given above that there is always a small residue of chlorine or fluorine. The expression "render free from halogens" used above is not to be interpreted to mean a quantitative elimination of the halogen compounds. The object of the process is to remove the halogens to such an extent that, on subsequent decomposition of the phosphates with acid, it is possible to avoid the above mentioned disadvantages, which are connected with the decomposition of raw phosphates when they have not undergone any previous treatment.

The word "solid" has been used in the appended claims to distinguish from a liquid or slurry, and is intended to include any material which is coherent enough to be capable of crushing into separate pieces, as, for example, the semi-solid products described in the examples.

I claim:

1. In the treatment of raw phosphate for producing valuable products therefrom, a decomposition process which comprises mixing the raw phosphate with a phosphoric acid reactive agent to decompose objectionable halogen compounds, expelling detrimental halogens by calcining the resultant reaction mass, and thereafter subjecting the calcined product to an acid treatment for recovery of valuable products therefrom.

2. In the treatment of raw phosphate for producing valuable products therefrom, a process as defined in claim 1, in which calcining is carried to a temperature of about 1000° C.

3. In the treatment of raw phosphate for producing valuable products therefrom, a decomposition process which comprises mixing the raw phosphate with a superphosphate, crushing the resulting product, expelling the detrimental halogens by calcining said product, and thereafter subjecting the calcined product to an acid treatment for recovery of valuable products therefrom.

4. The process of treating raw phosphate for producing valuable products therefrom which comprises pulverizing the raw phosphate, treating the same with a solution containing a phosphoric acid reactive agent, removing halogens by calcining the resulting mixture, treating the calcined product with acid, further treating the resulting solution to recover the desired products therefrom, and returning to the calcination process salt solutions containing phosphoric acid obtained by washing operations in the course of the process.

ANTONIUS FOSS.

CERTIFICATE OF CORRECTION.

Patent No. 1,994,070.  March 12, 1935.

ANTONIUS FOSS.

It is hereby certified that error appears in the printed specification of the above numbered patent requiring correction as follows: Page 1, first column, line 53, before "reacting" insert the word acid; and that the said Letters Patent should be read with this correction therein that the same may conform to the record of the case in the Patent Office.

Signed and sealed this 21st day of May, A. D. 1935.

(Seal)

Leslie Frazer
Acting Commissioner of Patents.